Figure 1:
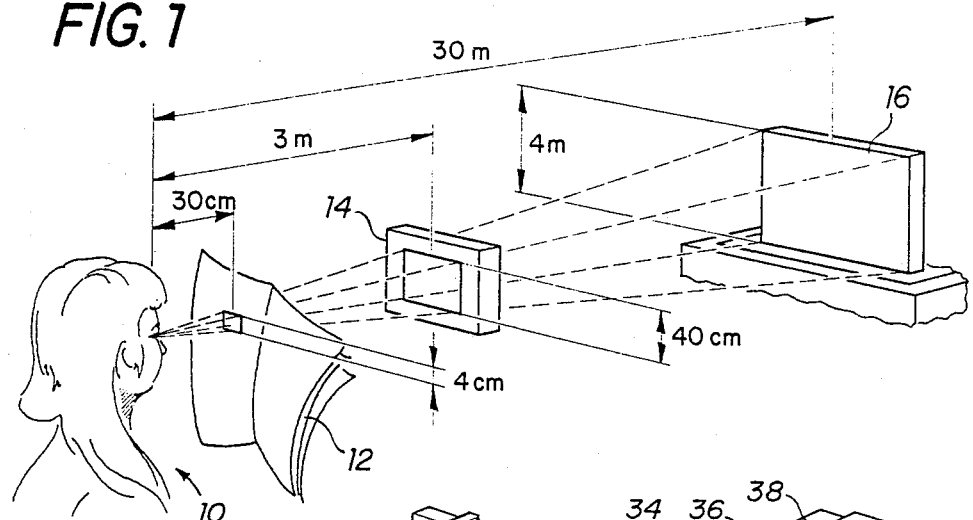

United States Patent [19]

Bobak

[11] Patent Number: 4,791,417

[45] Date of Patent: Dec. 13, 1988

[54] DISPLAY DEVICE

[76] Inventor: Tadeusz Bobak, 540 San Vincente Blvd., Apt. 4, Santa Monica, Calif. 90405

[21] Appl. No.: 713,409
[22] PCT Filed: Mar. 1, 1984
[86] PCT No.: PCT/US84/00324
    § 371 Date: Nov. 1, 1984
    § 102(e) Date: Nov. 1, 1984
[87] PCT Pub. No.: WO84/03577
    PCT Pub. Date: Sep. 13, 1984

[30] Foreign Application Priority Data

Mar. 1, 1983 [CH] Switzerland ............... 1115/83

[51] Int. Cl.⁴ .............................. G09G 3/36
[52] U.S. Cl. ..................... 340/784; 340/765; 340/793; 340/805
[58] Field of Search ............ 340/700, 701, 702, 703, 340/752, 784, 792, 793, 815.27, 785, 767, 765, 787, 805; 350/334

[56] References Cited

U.S. PATENT DOCUMENTS

| | | | |
|---|---|---|---|
| 3,603,984 | 9/1971 | Heilmeier | 340/752 X |
| 3,614,509 | 10/1971 | Willson | 340/752 X |
| 3,886,403 | 5/1975 | Owaki et al. | 340/793 |
| 4,006,476 | 2/1977 | Romney | 340/815.27 |
| 4,028,692 | 6/1977 | Ngo | 340/701 X |
| 4,330,813 | 5/1982 | Deutsch | 340/784 X |
| 4,365,869 | 12/1982 | Hareng et al. | 340/784 |
| 4,367,464 | 1/1983 | Kurahashi et al. | 340/701 |
| 4,368,485 | 1/1983 | Midland | 340/701 X |
| 4,399,434 | 8/1983 | Bielaa | 340/701 |
| 4,427,979 | 1/1984 | Clerc et al. | 340/793 |
| 4,495,492 | 1/1985 | Anderson et al. | 340/793 |
| 4,531,121 | 7/1985 | Brown | 340/815.27 X |
| 4,560,982 | 12/1985 | Sonehara et al. | 340/784 |
| 4,617,563 | 10/1986 | Fujiwara et al. | 340/784 |

Primary Examiner—Gerald L. Brigance
Assistant Examiner—Jeffery A. Brier
Attorney, Agent, or Firm—Ostrolenk, Faber, Gerb & Soffen

[57] ABSTRACT

The device comprises a two-dimensional display panel (20) composed of interchangable unit modular (24). Each module is composed of display elements which are nematic or smectic LCD cells. Half-tones may be produced by either changing the contrast of the LCD or in subdividing each display element into several unit cells which are, as desired, switched to light or dark and thus producing the impression of a more or less dark dot. The device serves to communicate information in the form of fixed or changing images or sign groups and can also be used for advertisement.

14 Claims, 2 Drawing Sheets

U.S. Patent  Dec. 13, 1988  Sheet 1 of 2  4,791,417

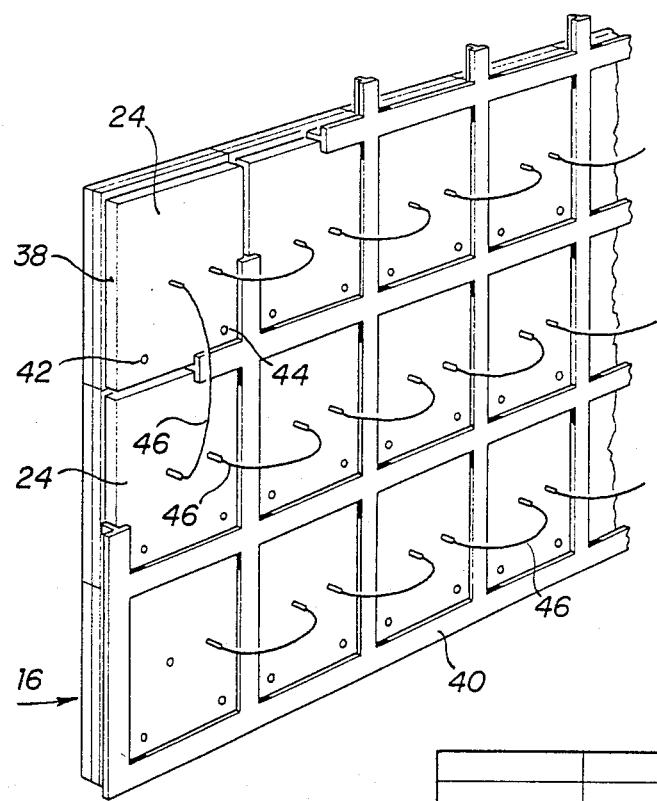
FIG. 4
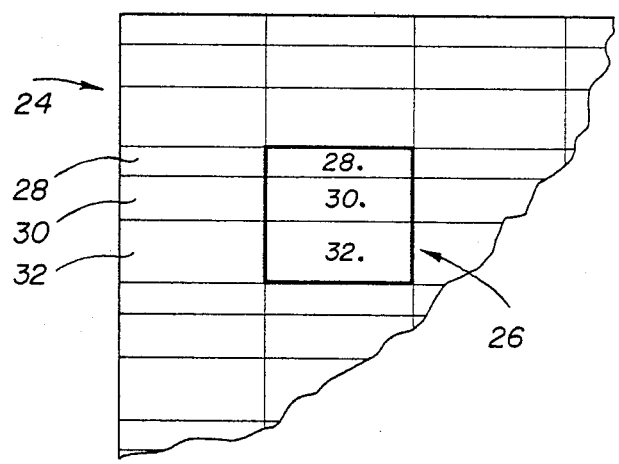
FIG. 5
FIG. 6
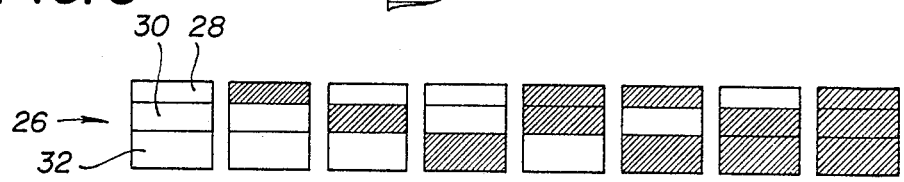
| Flächenanteil weiss | 9/9 | 7/9 | 6/9 | 5/9 | 4/9 | 3/9 | 2/9 | 0/9 |
|---|---|---|---|---|---|---|---|---|
| Grauwert | 8 | 7 | 6 | 5 | 4 | 3 | 2 | 1 |

DISPLAY DEVICE

This invention relates to a novel display device, namely to such a device which is run in a controlled-automatic mode in order to display different or changing images, e.g. portraits, objects, scenes, series of alphanumerical signs, etc., the display being of short or long duration. The display device is based upon visibilization of signs the principal of mosaic or dot matrix systems.

Primarily, this display device is a large scale advertising panel displaying dynamic information. However, it should also comprise panels capable of the transmission and supplying of any other information as it will be described later.

Device for the display and the visibilization of images and other information are already known. For example. U.S. Pat. No. 3,273,140 discloses a display panel having a large plurality of lamps being energized according to a program such that an image is formed by the combination of light and dark lamps. A similar device is disclosed in U.S. Pat. No. 2,239,522 wherein coloured lamps are used, and in U.S. Pat. No. 3,210,757.

Another kind of display scale is described in U.S. Pat. No. 3,270,447. According to that patent, the display panel is subdivided in a plurality of small cells each containing a reflector which can be positioned at different depths within its cell by electromagnetic means.

U.S. Pat. No. 3,486,258 discloses means for the displaying of animated images whereby display elements are displaced behind a screen. Furthermore, U.S. Pat. No. 3,482,344 describes a display panel wherein flat display means are pivotable by 180°. When an image is to be formed or cancelled, the whole screen must be transported from one station to another where the display means are pivoted by fluid means.

All these known devices first suffer from the common severe drawback of high power. Furthermore, they are very expensive to. Display panels with electric lamps have the additional disadvantage that lamps must always be replaced since they have a limited lifetime, the replacement being logistically difficult. Further, illuminated areas never cover the entire surface area of the screen since the lamps have a circular section and the panel elements a square one, and the light density is furthermore not the same on the circular lamp section.

Other known display devices are too expensive in function or too complicated.

The display processes and devices of U.S. Pat. Nos. 4,186,394 and 4,328,492 (issued to the applicant) resolve a number of the cited problems and have substantial advantages but are still complex in construction.

The primary object of the invention is to provide a novel display panel which will be able to function in an automatic mode and capable of rendering visible different information such as images of persons, scenes, signs, advertisements and so on.

A further object of this invention is to provide a display system being well visible in daylight as well as in artificially illuminated areas like halls, airport lounges etc., capable of displaying information, e.g. on sport fields, without difficulties. The display panel should furthermore offer the possibility of reproducing the displayed images with half-tones.

Still a further object of this invention is to render visible the display in the form of a mosaic or a dot matrix pattern by the device to be developed whereby, however, the different points or dots must not be distinguishable by the naked eye but the image should give the impression of being continuous with half-tones.

The device should be arranged, according to another object of this invention, in such a way that it works in a reliable and simple manner and is of uncomplex construction, and that it renders possible a rapid change of the displayed image. Furthermore, the device should be capable of being constructed in a most economic and automatic way.

These objects of the invention are fulfilled by a display device, one embodiment of which may include a large area display panel, for controlled auotmatic display of optical information in a dot matrix, comprising a two-dimensional display panel subdivided into a plurality of display modules each of which are composed of a plurality of liquid crystal twist cell display elements capable of being switched between a "light" position giving a white optical impression, and a "dark" position giving an approximated black optical impression, and also half tones between light and dark.

The invention is based upon the use of LCD (liquid crystal display) systems which are also known as "twist" cells. Such devices are not new and now exhibit a high degree of reliability. They have a useful life of about 50,000 hours. A condensed review has been published in ELO 1980, fasc. 6, under the title "Drehzellen", p. 61–64.

Currently, cell sizes resulting in a display area of several square centimeters are possible. The service temperature may be in the range of from $-15°$ to $+65°$ C., which is acceptable in practice. The power consumption for each cell is 1 $\mu W/cm^2$ corresponding to a total power of only 0.18 W for an large display panel of $6 \times 3$ m front area; however, several times this value is required for powering the control circuitry.

Furthermore, the response of the twist cells has been improved by the state of the art and allows shift frequencies between the light and dark states of about 5 to 8 cycles per second. This will soon accomodate the display of continuously moving pictures, which requires a picture changing frequency of at least 10 Hz (cycles per second), as in movies and television. Furthermore, colour devices of this nature are similarly possible.

Compared with conventional electro-optical display devices, the present invention has the advantage of an incomparably higher service life and a lower power consumption by several magnitudes. Compared with electromechanical devices, the invention has the advantage of a simpler and more compact construction, a faster image shift, and a better optical resolution. Compared with all known display devices of the kind considered here, the invention presents a much simpler and less expensive construction and half-tone formation.

The display panel itself, the main component of the device, is composed of single modules of a practical size, e.g. $25 \times 35$ or $30 \times 50$ cm (about $10 \times 14$ or $12 \times 20$ inch), which are mounted with mutual contact in a supporting frame structure, forming together the display area. On the rear side, they are electrically interconnected. They can easily be replaced individually if necessary. Each module is composed of a plurality of display elements. In order to display half-tones (gray values, each display element may comprise several unit cells, normally three, each of them being either transparent (light) or opaque (dark).

According to still another idea of this invention, the gray values may also be obtained in another, often simpler way. Conventional LCD cells contain liquid crystals in the nematic or the smectic state, and there exists an optoelectric characteristic curve of the LCD display. The cell contrast is substantially zero below and up to a certain threshold voltage (about 1 V) and rises at higher voltages up to its maximum value at the saturation voltage (about 3 V); large regions of the curve are non-linear.

It has now been found that a desired half-tone contrast may be obtained in a very simple manner by the drive control of the cell when applying the control voltage in the conventional phase shift mode, but not using the normal, fixed phase angle of 180° but with a variable phase angle between 0° and 180°, dependent upon the desired gray value. As a result of this method, the liquid crystals are not completely aligned in twisted position, so that the contrast does not reach its maximum value. Furthermore, the relation between phase angle and twist angle is, contrary to the relation between the control voltage: twist angle, substantially linear.

The phase angle may be varied by any known method, although digital techniques are preferred, it will be sufficient to provide for a limited number of fixed angles, about 10 at most, in the range of from 0° to 180° in order to obtain the necessary gray value variations. Furthermore, digital data storage and supply is much easier than an analogue one.

The LCD cells of each module are preferably controlled and driven by multiplexing methods.

The display device of this invention has the further advantage of being relatively lightweight and has a small physical dimensions. These properties permit its use indoors in airport and railway station lounges, sport arenas, gymnasiums, supermarkets, etc. Due to the rigid, solid construction free from movable parts, and the large service temperature range of the LCD cells, the panel is also suited for outdoor use; the display area should of course be protected, against direct sunlight in order not to unduly compromise the image contrast.

Figure 2:
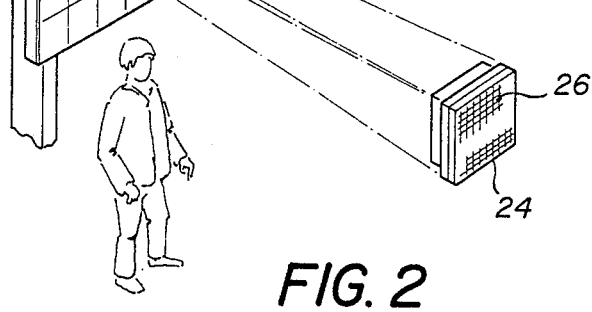
Figure 3:
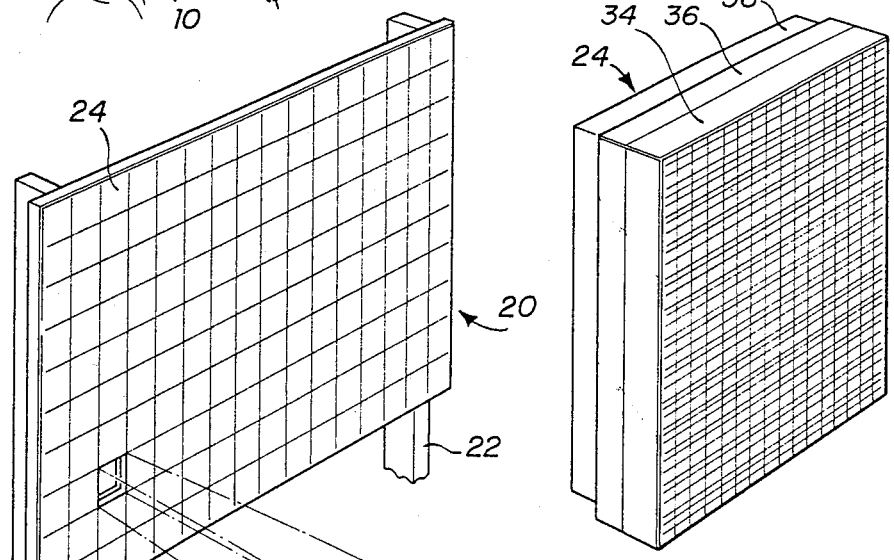

The invention shall now be explained in detail by the aid of examples of execution, with reference to the drawing wherein FIG. 1 schematically represents, in a perspective view, the optical principle of large scale display panels;

FIG. 2 schematically shows, in a perspective view, the modular construction of a display panel;

FIG. 3 in perspective view the principal construction of a module;

FIG. 4 a rear perspective view of the display panel according to FIGS. 2 and 3;

FIG. 5 a front view of the above left corner region of a module, and

FIG. 6 schematically the forming of half-tones.

The display system of the invention provides a continuous, substantially dot-free image or pattern. The theoretical optical basis therefor is illustrated in FIG. 1.

It is well known that the human eye cannot distinguish two dots as such which have a distance from each other less than about 0.1 mm at the normal visual range, i.e. at about 25 to 30 cm.

In FIG. 1, the reader 10 holds a newspaper 12 at the visual distance of 30 cm. She looks at a picture being about 40 mm in height. The newspaper picture is composed, in a conventional manner, of dark and light dots having a distance, in the picture plane, of less than about 0.1 mm so that the picture appears as a continuous one. This picture remains continuous, if it is displayed on a TV screen 14, about 40 cm high, when a visual distance thereto of about 3 m is selected, although the dark and light dots on the screen are greater. On the TV screen, 625 lines are displayed such that the distance between two adjacent lines is 40:625=0.064 cm or 0.64 mm. Since the visual distance is about 3 m, the TV picture gives the same continuous visual impression as a newspaper having a height of 40 mm at a distance of 30 cm; the apparent distance between two adjacent vertical dots (corresponding to the TV picture lines) will be 0.64:10=0.064 mm, a value inferior to the resolution limit of 0.1 mm (at the normal visual range). Now, if a display panel is seen at a distance of about 30 m, a dot distance of 0.1 mm in the normal visual range (30 cm) will correspond to a dot distance and, at the same time, to a dot diameter of 0.1×300=30 mm. Therefore, if the display on panel 16 should be composed of dark and light dots or elements having a linear dimension in the panel plane of not more than 10 mm, the thus formed image will appear continuous to the viewer at a visual distance of 10 m or more.

The display panel of the invention takes advantage of this fact in having its surface divided into elements which may have a height and width of only about 5 to 10 mm. Images on such a panel appear continuous at a visual distance of 10 m or more. At shorter distances, the image appears slightly dotted but still perfectly recognizable.

The general arrangement of the display panel is shown in FIG. 2. The shape of the panel may be as desired. Examples are rectangular, trapezoidal, squared, triangular, oval and circular panels. The panel may be fixed to posts 22 but may also be suspended from above, inclined or curved, may fill in the space above doors, etc. This is the modular subdivision of the panel which offers these substantially unlimited possibilities.

The large display panel 20, being typically about 2 to 15 m high and 4 to 30 m broad, is composed of a plurality of identical modules 24. For example, each module has the dimensions 28.5×31.7 cm but may also be square shaped, 40×40 cm. All modules 24 are of identical construction which will now be described. Each module 24 is composed of a plurality of, for example, rectangular display elements (abbreviated D-elements) 26 (FIG. 5), and each D-element comprises at least one cell. FIGS. 5 and 6 show a preferred embodiment wherein each D-element 26 comprises three cells 28, 30 and 32, which have the same width but whose height is different from each other. The total composition of these three cells forming a D-element 26 has the same width and height, namely about 6.35 mm.

Such a D-element 26 is shown in frontal view in FIG. 5. All D-elements 26 are rectangularly or square shaped. They form a honey-comb-like network within the module 24. Each one of cells 28, 30 and 32 is a LCD display (twist cell). The width of all cells is the same, namely 1/1 in arbitrary units. The hight of the cells is however different from each other. For example, cell 28 has 2/9 (two ninth) of the total height of the element 26, cell 30 has 3/9 (three ninth), and cell 32 4/9 (four ninth).

The reason for this particular division of element 26 in three differently sized cells is the following:

Images of deep black dots on white background appear hard and crude and do not make a three-demensional impression. However, when half-tones are introduced, the image becomes soft and appears plastic and three-dimensional. The invention permits the creation of such a plastic effect by the introduction of half-tones.

The described system comprises eight gradations between black and white. As it becomes clear from FIG. 6, a plain white colour of the dot being represented by the D-element 26, is obtained by shifting all three cells 28, 30, 32 to white. This corresponds to degree 8 on the gray scale. If cell 28 is switched to black, 7/9 of the total surface area of the element appear white, and 2/9 appear black. This corresponds to degree 7 on the grey scale.

In following Table 1, the gradations of the grey scale depend upon the switching state of cells 28, 30 and 32. In this table, the word "off" says that the corresponding cell does not receive a voltage, whereas "on" indicates that the cell received control voltage and thus appears black.

TABLE 1

| Cell switching state (FIG. 6) | | | proportion of white front face | degree of grey scale |
|---|---|---|---|---|
| 28 | 30 | 32 | | |
| off | off | off | 9/9 | 8 (white) |
| on | off | off | 7/9 | 7 |
| off | on | off | 6/9 | 6 |
| off | off | on | 5/9 | 5 |
| on | on | off | 4/9 | 4 |
| on | off | on | 3/9 | 3 |
| off | on | on | 2/9 | 2 |
| on | on | on | 0/9 | 1 (black) |

This table shows that all gradations of the gray scale and thus all desired half-tones can be reproduced and displayed by a corresponding combination of the switched state of said three cells which have corresponding sizes.

Now, FIG. 3 schematically shows a module 24 in perspective view. The module 24 is composed, in a sandwich-like manner, of three structural elements or construction units: On the front side, there is first the display unit 34 which comprises, as it has already been described, a plurality of LCD elements, each of which being in turn being subdivided into cells. Typically, the commercially available LCD twist cells have connections available at the rear side. Therefore, it is advantageous that the flat control unit 36 is placed behind the also flat display unit 34. Control unit 36 contains the necessary multiple control devices, typically as integrated circuits, for each of the cells of the display elements. As a third "layer" behind control unit 36, there is a flat power unit 38 containing the electric power supply of the module as well as microprocessors and memories for treating and storing of the data for the images and signs to be displayed (as far as it will not be preferred to incorporate at least part of such microprocessors and memories in the control unit 36).

Current state of the art permits one to fabricate a device having a depth T of not more than about 7.5 cm.

The display panel may also be constructed in another manner, not represented here but easily to be understood by the man skilled in the art. Namely, the basic panel 20 may be built up by rigidly incorporated control units 36 (FIGS. 2 and 3) and power units 38 whereas each display unit 34 is removably fixed onto the corresponding control unit 36. The mode of placing all units 34 on units 36, assuring simultaneous electric contacts, comprised providing rearwardly directed contact pins, like such used in integrated circuits, along the four edges of each display unit, in the edge region of, say 2 to 6 mm (even until 1 cm) wide. These pins are then connected to the columns and rows of the LCD cells 28,30,32 (FIG. 5) in order to energize them in a multiplex manner. This technique, and also the connecting of the cells to the pins, is known per se. The display units 34 may thus be fixed on the panel board 20 in the manner of wall tiles.

If should also be noted that the display device may easily be combined with means for producing sound effects which are not represented in the drawing. However, the man skilled in the art will realize that loudspeakers may be incorporated into the display of FIG. 2, for example into the peripheral border zones or behind, above, below or at the sides of the display panel 20. Such sound effects may be human voice, music, noises etc. Data or signals corresponding to such sound effects may be stored together with the video signals, e.g. on magnetic tapes, which will be explained later.

FIG. 4 shows a rear view of a portion of the display panel. The basic structure is formed by a T profile frame 40, the leg of the T's being directed to the front. The modules 24 (FIG. 3) are inserted from the front into the frame 40 which represents an array of squares. If the power unit is made smaller at its periphery by the thickness of the leg of the T profile, see FIG. 4, the modules 24 enter laterally into contact with their display and control units 34, 36 so that the particular modules can no longer be distinguished one from another when viewed from the front.

The modules 24 are fixed to the frame 40 by means not shown but well known in the art, and they can be changed in case of breakdown within a few seconds.

Each module 24 has at the rear side of its power unit 38 plug-in connection means 42, 44 which can be connected with information-carrying coaxial cables, current cables, etc. Furthermore, the modules 24 are interconnected by data cables 46 since each module must produce a partial image, all partial images contributing to the formation of the correct overall image on the panel.

In order to display an image, the original to be displayed is subdivided into a dot matrix, the number and distribution of the dots corresponding to that of the display elements 26, and each dot is assigned one to seven digital gray panel values. Such processes are well known in the television art, and may be accomplished electronically by microprocessor and memory circuits. The control units 36 of the modules 24 of the display panel 16 are preprogrammed for the display. Now, when applying the collected digitalized information of an image to be displayed, the control units of all cells 26 of the module are energized in accordance with the location and the gray value of each image dot.

The methods and steps disclosed herein can be realized with the knowledge of the one skilled in electronics, in a manner well known, and need not be described in detail here, the more as there is more than one way for the practical realization.

Finally, it should be noted that the LCD normally function in the nematic range. The relatively limited angle of view of about 45° is disadvantageous. Therefore, it is also possible to have a display in the smectic range where an angle of view of more than 160° can be obtained. However, this service range is limited to a relatively small temperature range, and special liquid crystals must normally be selected for smectic applications. These facts which may sometimes bring about drawbacks will certainly be changed by the progress of the LCD art.

One skilled in the art will understand that the methods described or suggested here to transform an original image into a displayed one, can also be carried out by means other than those described herein without diminishing the invention since the steps appropriate or necessary for the data production and treatment belong to the conventional knowledge of the well trained electronic engineer or expert.

The new device for the display of mosaic-like images of this invention presents many advantages, as already pointed out. The displayed image is well visible in daylight and also in artificially lighted spaces and need not specially be illuminated. It can rapidly be changed and renewed since the display is subdivided into modules. This advantage allows the display of rapidly changing information; for example, sport results may be displayed followed by advertisement which, in turn, may rapidly be replaced by other sport results. Furthermore, the information for the image composition can easily be stored electrically or magnetically so that an image can be displayed repeatedly without need for anew scanning the original. Artificial images may also be produced and displayed in a very easy manner, and one may display LCD movies on the panel of the invention without need for projection means.

I claim:

1. A large panel display device, comprising:
   a viewable panel having a front surface for displaying an image thereon and a rear side opposing to said front surface;
   said front surface being comprised of a plurality of display elements, each display element including a plurality of liquid crystal display cells, each liquid crystal display cell having a viewable reflective surface which is different in size than the remaining reflective surfaces of the other display cells in said display element and which is operable in a first mode wherein light directed at said reflective surface is reflected by said surface and in a second mode wherein light directed at said reflective surface is absorbed at said reflective surface;
   said image being produced solely by the reflection of light from said front surface and said large panel display device lacking and requiring no rear lighting for illuminating said front surface whereby said large panel display device is capable of being positioned against an opaque support;
   control means for independently controlling said first and second mode of operation of each liquid crystal display cell, said control means providing energizing signals to said cells having a variable phase shift adjustable between 0° and 180°; and
   support means for supporting said display elements to form said large panel display device.

2. A large panel display device as set forth in claim 1, wherein the control means can selectively change the visual characteristic of one or more display cells within any display element.

3. A large panel display device as set forth in claim 2, wherein the display cells are rectangular in shape.

4. A large panel display device as set forth in claim 1, wherein each of the display elements has three display cells, the display cells having a relative ratio of the size of display surfaces of 2:3:4.

5. A large panel display device as set forth in claim 4, wherein the display cells are nematic phase liquid crystals.

6. A large panel display device as set forth in claim 4, wherein the display cells are smectic phase liquid crystals.

7. A large panel display device as set forth in claim 2, wherein the display elements are identical to each other.

8. A large panel display device as set forth in claim 7, wherein said large panel display device is comprised of a plurality of display modules and said display modules are positioned relative to one another to produce the front surface and wherein each of said display modules is, in turn, comprised of a plurality of said display elements.

9. A large panel display device as set forth in claim 8, wherein the display modules are identical to each other.

10. A large panel display device as set forth in claim 9, wherein the display elements within a display module are arranged in a matrix.

11. A large panel display device as set forth in claim 10, wherein the display modules are arranged in a matrix.

12. A large panel display device as set forth in claim 11, wherein the display modules are physically independent from each other.

13. A large panel display device as set forth in claim 2, wherein the display cells change from a first visual characteristic to a second visual characteristic.

14. A large panel display device as set forth in claim 13, wherein the first visual characteristic is black and the second visual characteristic is white.

* * * * *